(12) United States Patent
Ikejima

(10) Patent No.: US 10,275,417 B2
(45) Date of Patent: Apr. 30, 2019

(54) FILE PROCESSING SYSTEM THAT PROCESSES A DOCUMENT

(71) Applicant: Kyocera Document Solutions Inc., Osaka (JP)

(72) Inventor: Ayaka Ikejima, Osaka (JP)

(73) Assignee: Kyocera Document Solutions Inc., Osaka (JP)

( * ) Notice: Subject to any disclaimer, the term of this patent is extended or adjusted under 35 U.S.C. 154(b) by 566 days.

(21) Appl. No.: 14/598,804

(22) Filed: Jan. 16, 2015

(65) Prior Publication Data

US 2015/0205790 A1 Jul. 23, 2015

(30) Foreign Application Priority Data

Jan. 22, 2014 (JP) ................. 2014-009096

(51) Int. Cl.
*G06F 16/93* (2019.01)
(52) U.S. Cl.
CPC .................... *G06F 16/93* (2019.01)
(58) Field of Classification Search
CPC ............. G06F 17/30011; G06F 16/93
See application file for complete search history.

(56) References Cited

U.S. PATENT DOCUMENTS

| | | | | |
|---|---|---|---|---|
| 8,903,854 | B2 * | 12/2014 | James | G16H 10/60 707/769 |
| 2004/0246532 | A1 | 12/2004 | Inada | |
| 2010/0231949 | A1 | 9/2010 | Mori | |
| 2011/0040944 | A1 * | 2/2011 | Yamauchi | G06F 21/45 711/163 |
| 2013/0013662 | A1 | 1/2013 | Masuda | |
| 2014/0115329 | A1 * | 4/2014 | Sturonas | H04L 63/1466 713/165 |

FOREIGN PATENT DOCUMENTS

JP 2012208677 10/2012

* cited by examiner

*Primary Examiner* — Syling Yen
*Assistant Examiner* — Faezeh Forouharnejad
(74) *Attorney, Agent, or Firm* — K&L Gates LLP

(57) ABSTRACT

A file management system includes a management server, and an electronic device connectable to the management server through a network. The management server includes a first storage unit that stores therein a first workflow that defines first processing, which is executed with a first event as a trigger, for a file, and a first control unit that monitors, based on the first workflow, the first event and executes the first processing if the first event occurs. The electronic device includes a second storage unit that stores therein a second workflow that defines second processing, which is executed with a second event different from the first event as a trigger and in which a final processing operation generates the first event, for the file, and a second control unit that monitors, based on the second workflow, the second event and executes the second processing when the second event occurs.

4 Claims, 10 Drawing Sheets

FILE PROCESSING SYSTEM THAT PROCESSES A DOCUMENT

REFERENCE TO RELATED APPLICATIONS

This application is based upon and claims the benefit of priority from the corresponding Japanese Patent Application No. 2014-009096, filed in the Japan Patent Office on Jan. 22, 2014, the entire contents of which are incorporated herein by reference.

FIELD

The present disclosure relates to a file processing system that processes a document using a workflow.

BACKGROUND

In typical workflow processing, files such as documents and images are each processed by a workflow that performs processing based on a defined procedure. The workflow is selected and executed based on the type of a file.

When defining a workflow in order to perform, for a file, complicated processing in which a plurality of simple processing operations are combined, a user is required to define all these processing operations within one workflow.

SUMMARY

A file processing system according to an embodiment of the present disclosure includes a management server, and an electronic device connectable to the management server through a network. The management server includes a first storage unit and a first control unit. The first storage unit stores therein a first workflow that defines first processing, which is executed with a first event as a trigger, for a file. The first control unit monitors, based on the first workflow, the first event and executes the defined first processing if the first event occurs. The electronic device includes a second storage unit and a second control unit. The second storage unit stores therein a second workflow that defines second processing, which is executed with a second event different from the first event as a trigger and in which a final processing operation generates the first event, for the file. The second control unit monitors, based on the second workflow, the second event and executes the second processing if the second event occurs.

A file processing method according to an embodiment of the present disclosure includes: (i) storing, in a first storage unit in a management server, a first workflow that defines first processing, which is executed with a first event as a trigger, for a file; (ii) monitoring, via a first control unit in the management server, the first event, based on the first workflow; (iii) executing, via the first control unit, the defined first processing if the first event occurs; (iv) storing, in a second storage unit in an electronic device, a second workflow that defines second processing, which is executed with a second event different from the first event as a trigger and in which a final processing operation generates the first event, for the file; (v) monitoring, via a second control unit in the electronic device, the second event, based on the second workflow; and (vi) executing, via the second control unit, the second processing if the second event occurs.

A non-transitory computer-readable file processing program according to an embodiment of the present disclosure stores therein a file processing program executable by a computer. The file processing program includes first to sixth program codes. The first program code causes a computer in a management server to store, in a first storage unit, a first workflow that defines first processing, which is executed with a first event as a trigger, for a file. The second program code causes the computer in the management server to monitor the first event, based on the first workflow. The third program code causes the computer in the management server to execute the defined first processing if the first event occurs. The fourth program code causes a computer in an electronic device to store, in a second storage unit, a second workflow that defines second processing, which is executed with a second event different from the first event as a trigger and in which a final processing operation generates the first event, for the file. The fifth program code causes the computer in the electronic device to monitor the second event, based on the second workflow. The sixth program code causes the computer in the electronic device to execute the second processing if the second event occurs.

Additional features and advantages are described herein, and will be apparent from the following detailed description and the figures.

BRIEF DESCRIPTION OF THE DRAWINGS

All drawings are intended to illustrate some aspects and examples of the present disclosure. The drawings described are only schematic and are non-limiting, and are not necessarily drawn to scale.

DETAILED DESCRIPTION

Various embodiments are described below with reference to the figures. It should be understood, however, that numerous variations from the depicted arrangements and functions are possible while remaining within the scope and spirit of the claims. For instance, one or more elements may be added, removed, combined, distributed, substituted, re-positioned, re-ordered, and/or otherwise changed. Further, where this description refers to one or more functions being implemented on and/or by one or more devices, one or more machines, and/or one or more networks, it should be understood that one or more of such entities could carry out one or more of such functions by themselves or in cooperation, and may do so by application of any suitable combination of hardware, firmware, and/or software. For instance, one or more processors may execute one or more sets of programming instructions as at least part of carrying out one or more of the functions described herein.

Hereinafter, embodiments of the present disclosure will be described with reference to drawings.

Figure 1:
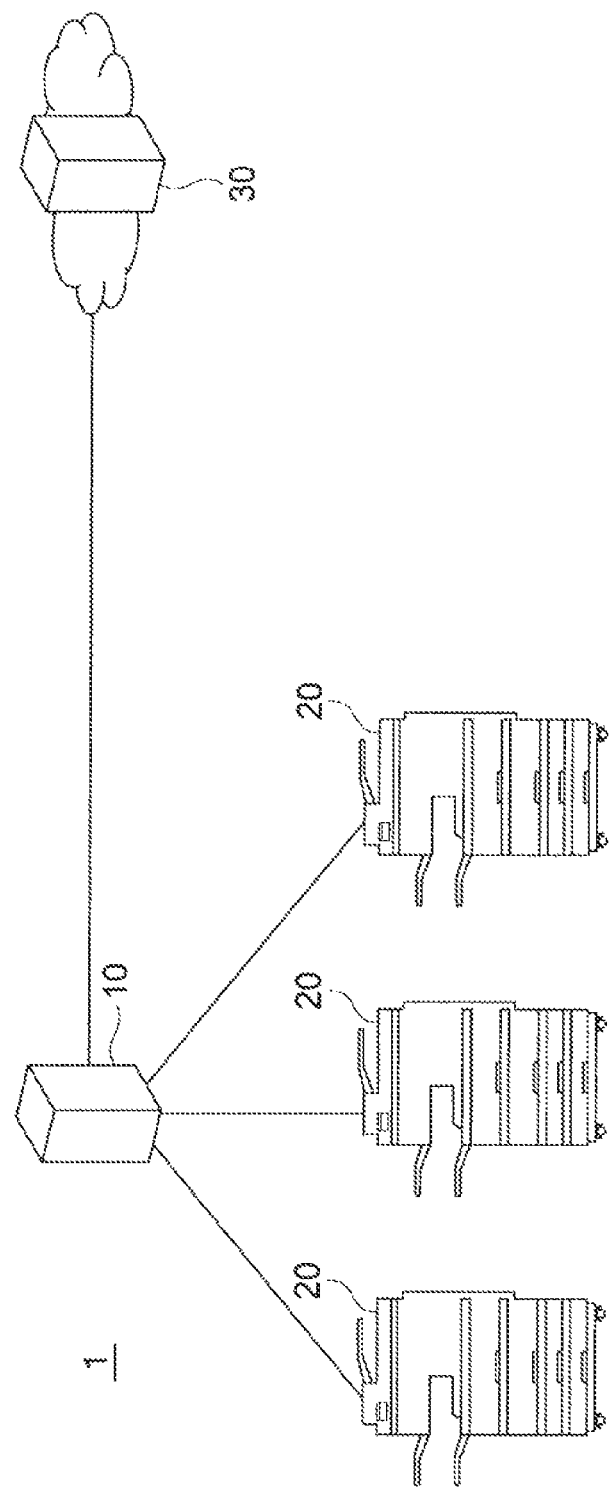
FIG. 1 illustrates an outline of a file processing system according to an embodiment of the present disclosure.

First, the outline of an embodiment of a file processing system will be described. FIG. 1 illustrates the outline of a file processing system according to an embodiment of the present disclosure.

As can be seen from FIG. 1, a file processing system 1 includes a workflow management server (a management server) 10 and one or more image forming apparatuses 20. Note that while three image forming apparatuses 20 are illustrated, the three image forming apparatuses 20 are equal in function and therefore only one thereof will be described in the following explanation.

Between the workflow management server 10 and the image forming apparatus 20, a connection is established through a network, specifically, a local area network (LAN). Connections with a system and a service 30 located outside the file processing system 1 are established through a network, specifically, a LAN or a wide area network (WAN).

The workflow management server 10 manages a shared workflow in which processing used in common or processing shared and used in the image forming apparatuses 20 located within the file processing system 1 is defined. A file generated by the image forming apparatus 20 may be transmitted to the external system or the external service 30 through the workflow management server 10. The details of the configuration of the workflow management server 10 will be described later.

The image forming apparatus 20 may generate a file by scanning and loading a document or a photograph and print or fax the content of the file generated by the scanning or a file acquired through the network. The details of the image forming apparatus 20 will be described later.

Specifically, the external system or the external service 30 is, for example, a cloud system or a cloud service, and the like.

As above, the outline of the file processing system is described. Note that while, in the above-mentioned explanation, the workflow management server 10 and the image forming apparatus 20 are treated as separate items and described, the image forming apparatus 20 may have the function of the workflow management server 10. In addition, the file processing system 1 may be configured only by the image forming apparatus 20.

Next, a workflow will be simply described. The term, "workflow", in an embodiment is a flow in which specific processing operations that includes a processing operation for "printing the content of a file", a processing operation for "converting the form of a file", and so forth are defined as "tasks". The execution order of one or more tasks is defined based on a series of processing operations a user intends to perform on a file and described in the workflow.

An event to serve as a trigger is detected, thereby staring the processing of the workflow. Examples of the event to serve as a trigger include, "a file is placed in a location", "a file is printed", "a file is deleted from a location", and so forth.

Examples of tasks for various kinds of events include, a processing operation of "to transmit an image log" may be defined for the event of "a file is printed", and a processing operation of "to make a backup" may be defined for the event of "a file is deleted from a location".

The content of a task may be switched based on the type of a file. If a file is, for example, a document, to convert the document into Portable Document Format (PDF), to convert a PDF file into a text file, to create the summary of the document, and to translate the document are possible.

If a file is a photograph or an image, to rotate the image, to add an annotation text, to add a map or a logo, to apply effect, and to reduce a size are possible.

Furthermore, as other tasks, to mail a file, to perform compression, to change a file name, to transfer to another system, to perform encryption or decryption, and to post to a microblogging site are possible.

Figure 2:
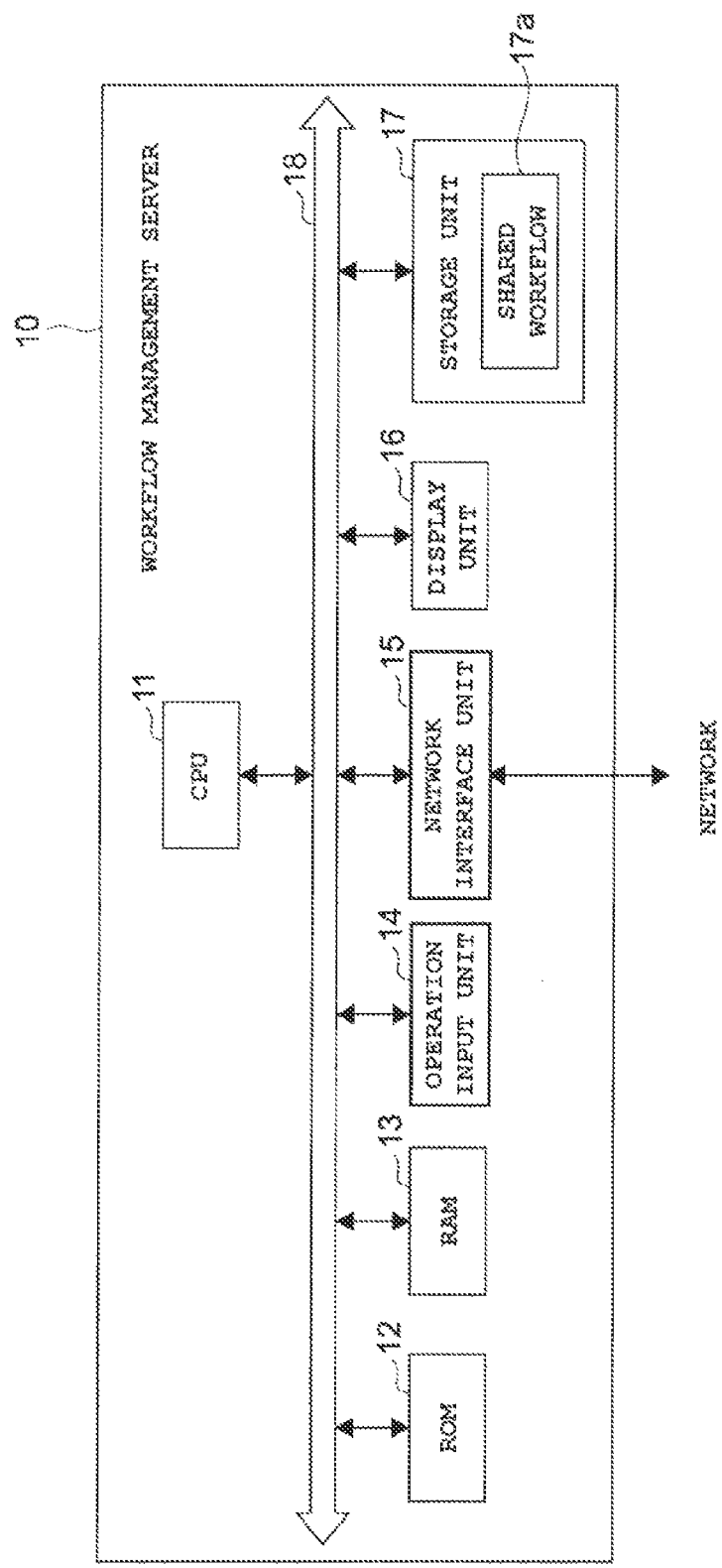
FIG. 2 illustrates a configuration of a workflow management server.

Next, the configuration of the workflow management server 10 will be described. FIG. 2 illustrates the configuration of the workflow management server 10.

As illustrated in FIG. 2, the workflow management server 10 includes a central processing unit (CPU) 11 (a first control unit), a read only memory (ROM) 12, a random access memory (RAM) 13, an operation input unit 14, a network interface unit 15, a display unit 16, and a storage unit 17 (a first storage unit). These individual blocks are connected through a bus 18.

The ROM 12 stores therein a plurality of programs such as pieces of firmware for executing various kinds of processing operations and data in a fixed manner. The RAM 13 is used as the working area of the CPU 11 and temporarily stores therein an operating system (OS), various kinds of applications in execution, and various kinds of data in processing.

The storage unit 17 is, for example, a hard disk drive (HDD), a flash memory, or another nonvolatile memory. In the storage unit 17, a shared workflow 17a to be described later is stored in addition to the OS, various kinds of applications, and various kinds of data.

The network interface unit 15 is linked to a network for exchanging information with the image forming apparatus 20 or the external system 30, collects information from the image forming apparatus 20, provides collected information to the image forming apparatus 20, and exchanges information with the external system or the external service 30.

From among a plurality of programs stored in the ROM 12 or the storage unit 17, the CPU 11 deploys, in the RAM 13, a program corresponding to an instruction supplied from the operation input unit 14 and suitably controls the display unit 16 and the storage unit 17 based on the deployed program.

In addition, based on the information collected from the image forming apparatus 20 through the network and the network interface unit 15, the CPU 11 updates the shared workflow 17a.

The operation input unit 14 is, for example, a pointing device such as a mouse, a keyboard, a touch panel, or another operation apparatus.

The display unit 16 is, for example, a liquid crystal display, an electro-luminescence (EL) display, a plasma display, a cathode ray tube (CRT) display, or the like. The display unit 16 may be embedded in the workflow management server 10 or may be externally connected.

Figure 3:
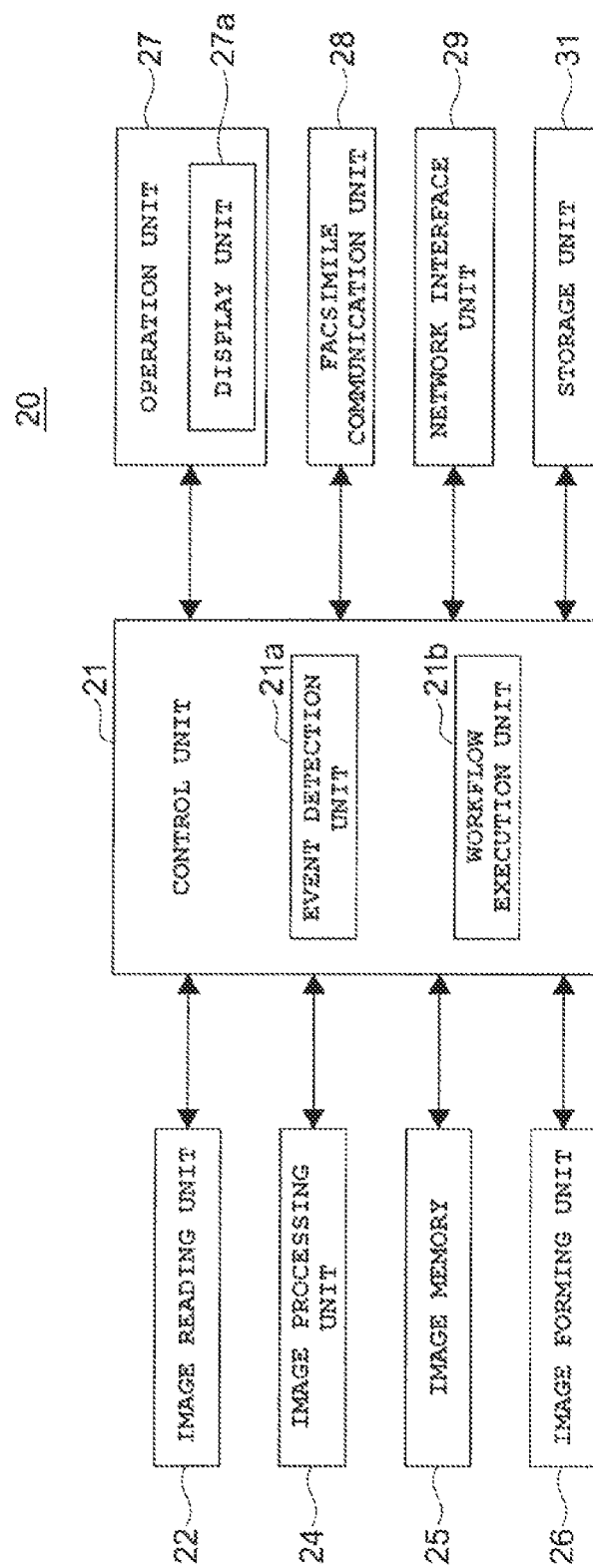
FIG. 3 illustrates a configuration of an image forming apparatus.

Next, the configuration of the image forming apparatus 20 will be described. FIG. 3 illustrates the configuration of the image forming apparatus 20. Typically the image forming apparatus 20 is a multifunction peripheral (MFP).

The image forming apparatus 20 includes a control unit 21 (a second control unit). The control unit 21 includes a CPU, a RAM, a ROM, a dedicated hardware circuit, and so forth and controls the whole operation of the image forming apparatus 20.

The control unit 21 is connected to an image reading unit 22, an image processing unit 24, an image memory 25, an image forming unit 26, an operation unit 27, a facsimile communication unit 28, a network interface unit 29, a storage unit 31 (a second storage unit), and so forth. The control unit 21 controls the operations of the above-mentioned individual connected units and transmits and receives signals or pieces of data to and from the individual units.

Based on an instruction to execute a job inputted from the user through the operation unit 27, a network-connected personal computer (PC), or the like, the control unit 21 controls the driving of and processing for mechanisms necessary for executing operation control relating to individual functions such as a scanner function, a printing function, a copying function, a facsimile reception and transmission function, and so forth.

The control unit 21 includes an event detection unit 21a and a workflow execution unit 21b. Each of the event detection unit 21a and the workflow execution unit 21b is a functional block realized by a program, loaded from the ROM or the like into the RAM and executed by the CPU.

The event detection unit 21a monitors the occurrence of an event for starting a workflow. Upon detecting the occurrence of an event defined in the workflow, the event detection unit 21a gives notice to the workflow execution unit 21b and causes a specific workflow associated with the detected event to be started.

Based on a notice of the occurrence of an event, received from the event detection unit 21a, the workflow execution unit 21b reads, from the storage unit 31, a workflow in which that event is defined as a trigger, and starts that workflow.

The image reading unit 22 reads an image from a manuscript.

The image processing unit 24 subjects the image data of the image read by the image reading unit 22 to image processing as appropriate. In order to improve the quality after the image read by the image reading unit 22 is formed, the image processing unit 24 performs, for example, image processing such as shading correction.

The image memory 25 is an area for temporarily storing therein the data of a manuscript image read by the image reading unit 22 and temporarily storing therein data to be a print target in the image forming unit 26.

The image forming unit 26 performs the image formation of image data or the like read by the image reading unit 22.

The operation unit 27 includes a touch panel unit and an operation key unit that each receive an instruction from the user regarding to various kinds of operations and processing operations executable by the image forming apparatus 20. The touch panel unit includes a display unit 27a such as a liquid crystal display (LCD) in which a touch panel is provided.

The facsimile communication unit 28 includes a coding and decoding unit, a modulation and demodulation unit, and a network control unit (NCU) and performs facsimile transmission utilizing a public telephone network.

The network interface unit 29 includes a communication module such as a LAN board and transmits and receives various kinds of data to and from a device such as the workflow management server 10 or the PC located within the local area network, through a LAN or the like connected to the network interface unit 29.

The storage unit 31 is a large-capacity storage device such as an HDD that stores therein a manuscript image or the like read by the image reading unit 22. In addition, an individual workflow serving as a workflow defined for each user is stored in the storage unit 31.

In the storage unit 31, a working area at the time of processing a file using a workflow and a document box used as a passing area at the time of passing files between a plurality of workflows are provided.

Next, the document box will be described.

Figure 4:
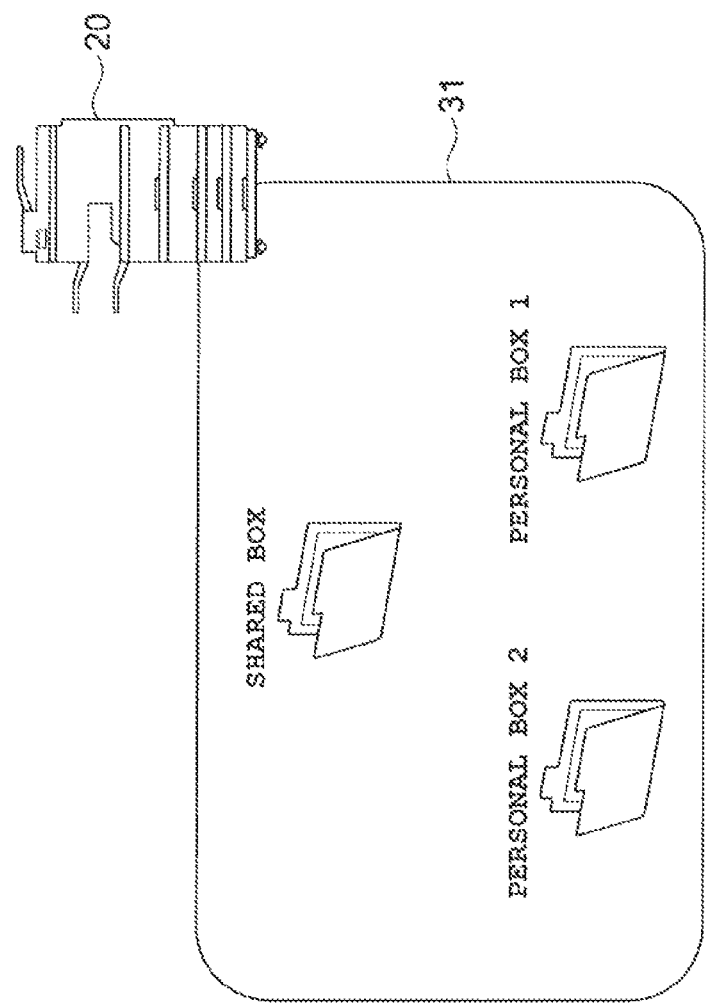
FIG. 4 illustrates a state of a document box provided within a storage unit in the image forming apparatus.

FIG. 4 illustrates the state of the document box provided within the storage unit 31 in the image forming apparatus 20.

Examples of the document box include a personal box used in the processing of an individual workflow defined for each user and a shared box used in the processing of a shared workflow shared and used between users.

In FIG. 4, in addition to one shared box, there are two personal boxes of a personal box 1 and a personal box 2 based on the assumption that two users exist.

However, there may be two or more shared boxes.

Next, processing for setting and registering a shared workflow will be described.

In order to process a file, based on a workflow, first it is necessary to set and register the workflow for the workflow management server 10 or the image forming apparatus 20.

Figure 5:
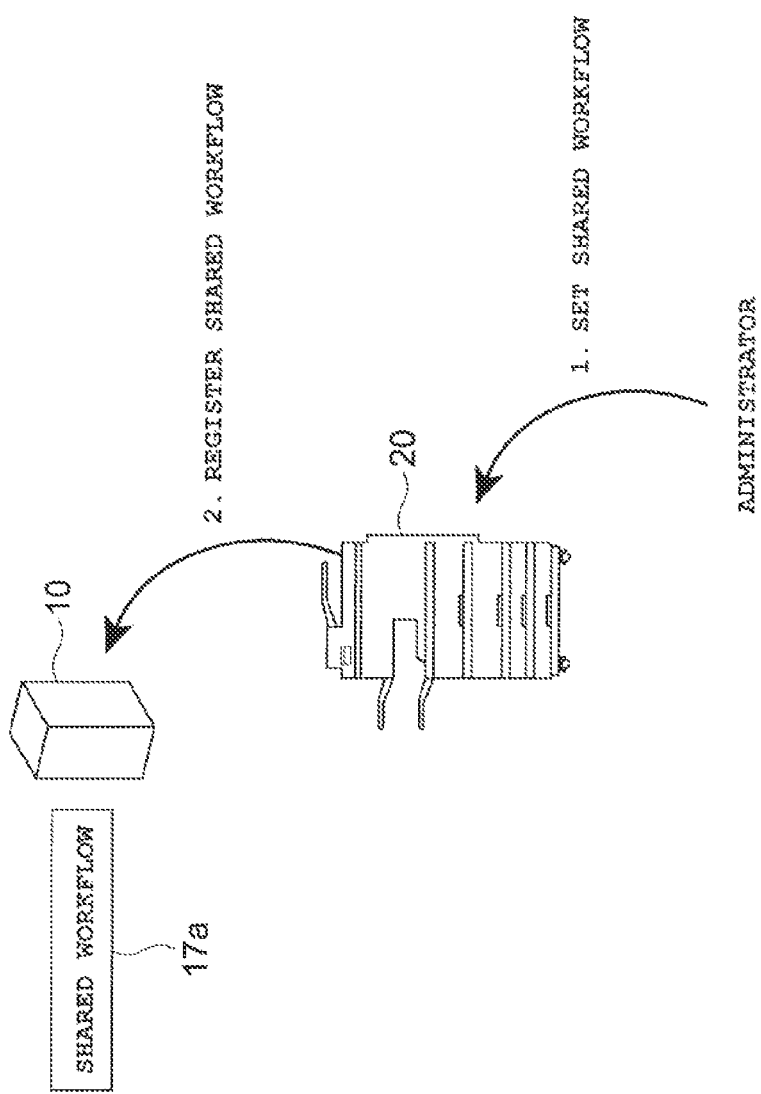
FIG. 5 illustrates processing for setting and registering a shared workflow in the workflow management server.

Here, processing for setting and registering the shared workflow in the workflow management server 10 will be described. FIG. 5 illustrates processing for setting and registering the shared workflow 17a in the workflow management server 10.

First, the administrator of the file processing system 1 sets the shared workflow 17a using the image forming apparatus 20.

Next, the image forming apparatus 20 registers the set shared workflow 17a in the workflow management server 10.

The registered shared workflow 17a is stored in the storage unit 17 in the workflow management server 10.

Here, as the content of the shared workflow 17a, it is assumed that a definition of, for example, "if an event (a first event) in which a file is placed in the shared box occurs, a task of registering the placed file in the external system 30 is performed" (first processing) is made.

Figure 6:
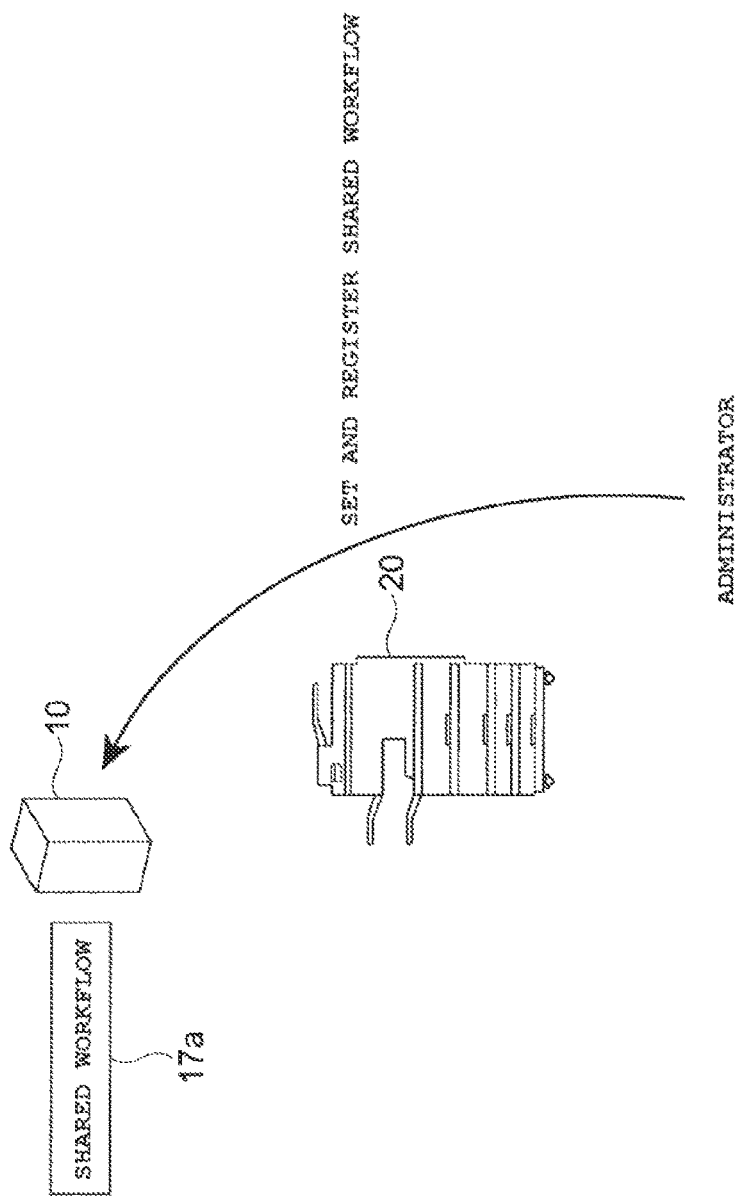
FIG. 6 illustrates processing for directly setting and registering the shared workflow in the workflow management server.

In the above-mentioned explanation, the configuration in which, after being set in the image forming apparatus 20 once, the shared workflow 17a is registered in the workflow management server 10 is described. However, without limitation to this, a configuration in which the shared workflow 17a is, for example, directly set and registered in the workflow management server 10 may be used. FIG. 6 illustrates the processing for directly setting and registering the shared workflow 17a in the workflow management server 10.

Next, a state after the shared workflow 17a is registered in the workflow management server 10 will be described.

Figure 7:
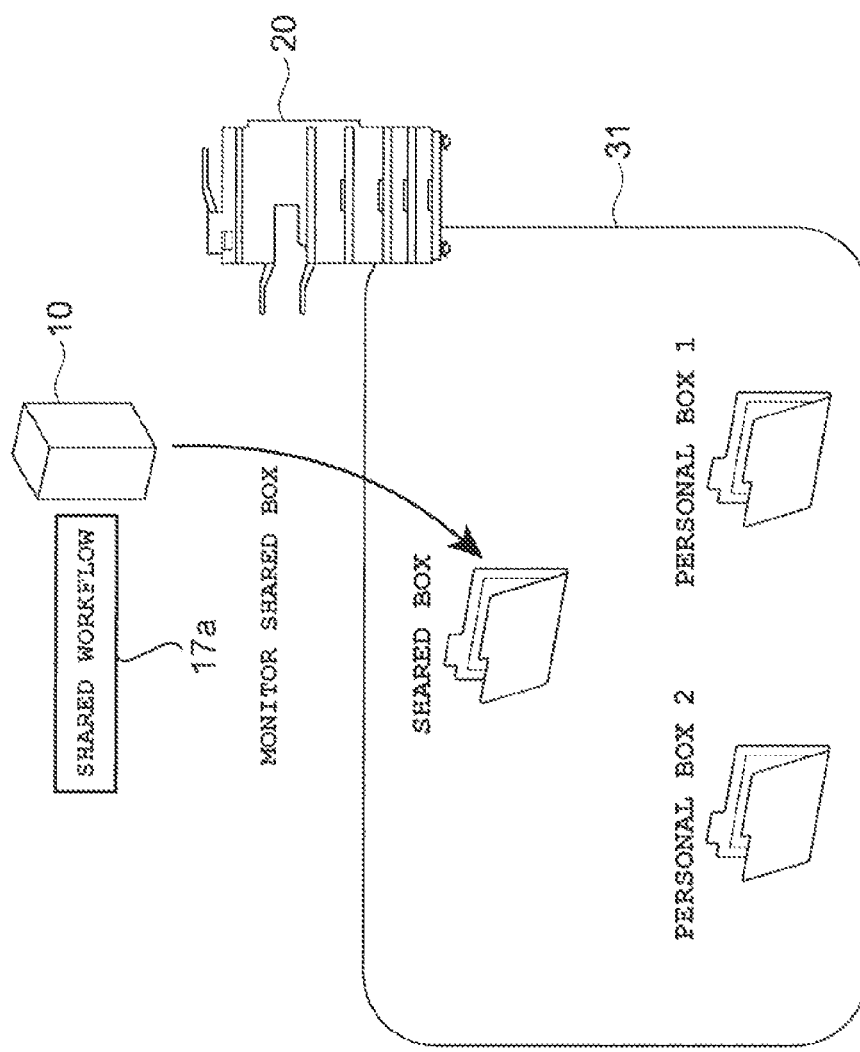
FIG. 7 illustrates a state after the shared workflow is registered in the workflow management server.

FIG. 7 illustrates the state after the shared workflow 17a is registered in the workflow management server 10.

As can be seen from FIG. 7, in order to detect the occurrence of the event of "a file is placed in the shared box" defined in the shared workflow 17a, the workflow management server 10 starts monitoring the shared box within the storage unit 31 in the image forming apparatus 20.

Next, the processing for setting and registering an individual workflow in the image forming apparatus 20 will be described.

Figure 8:
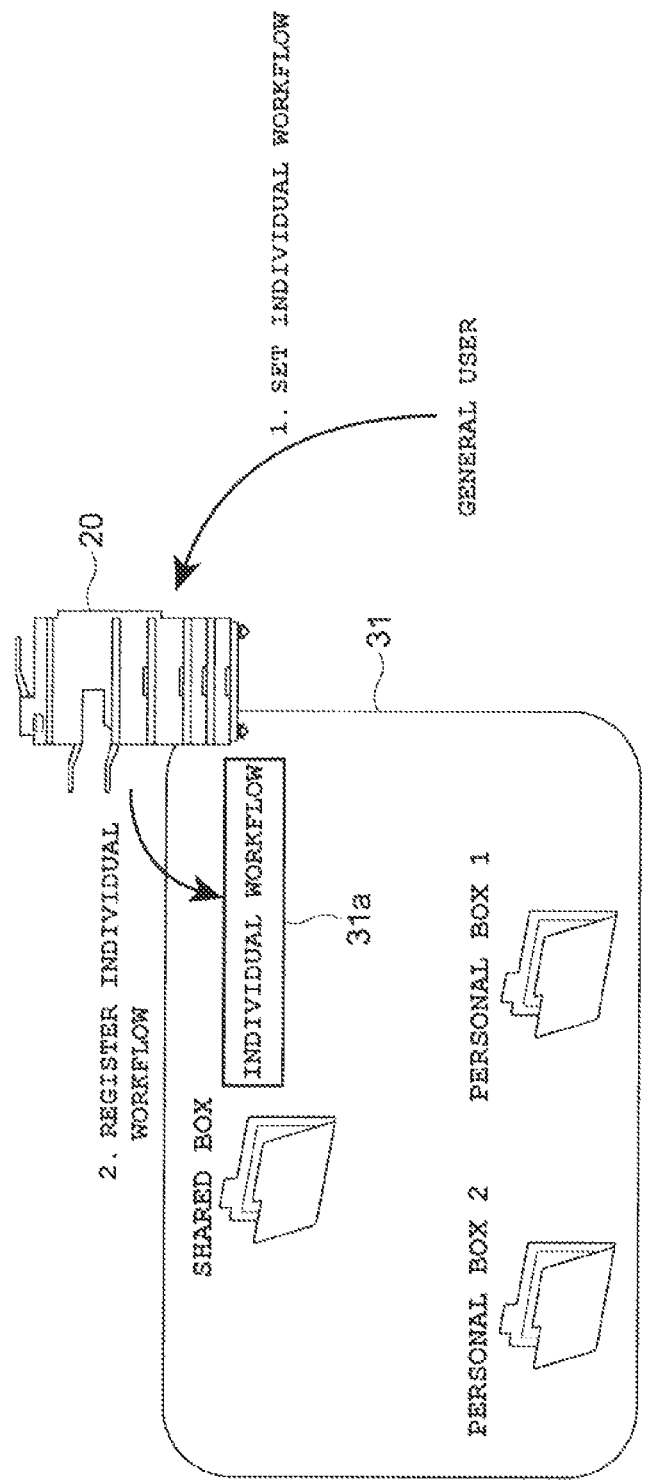
FIG. 8 illustrates processing for setting and registering an individual workflow in the image forming apparatus.

FIG. 8 illustrates the processing for setting and registering an individual workflow 31a in the image forming apparatus 20.

First, a general user of the image forming apparatus 20 sets the individual workflow 31a in the image forming apparatus 20.

Next, the image forming apparatus 20 stores the set individual workflow 31a in the storage unit 31 and completes the registration processing.

Here, as the content of the individual workflow 31a, it is assumed that a definition of, for example, "if an event (a second event) in which a document is placed in the personal box 1 occurs, a task of converting the placed document into a highly compressed PDF and a task of placing, in the shared box, the document converted into the highly compressed PDF are executed in this order" (second processing) is made.

Next, a state after the individual workflow 31a is registered in the image forming apparatus 20 will be described.

Figure 9:
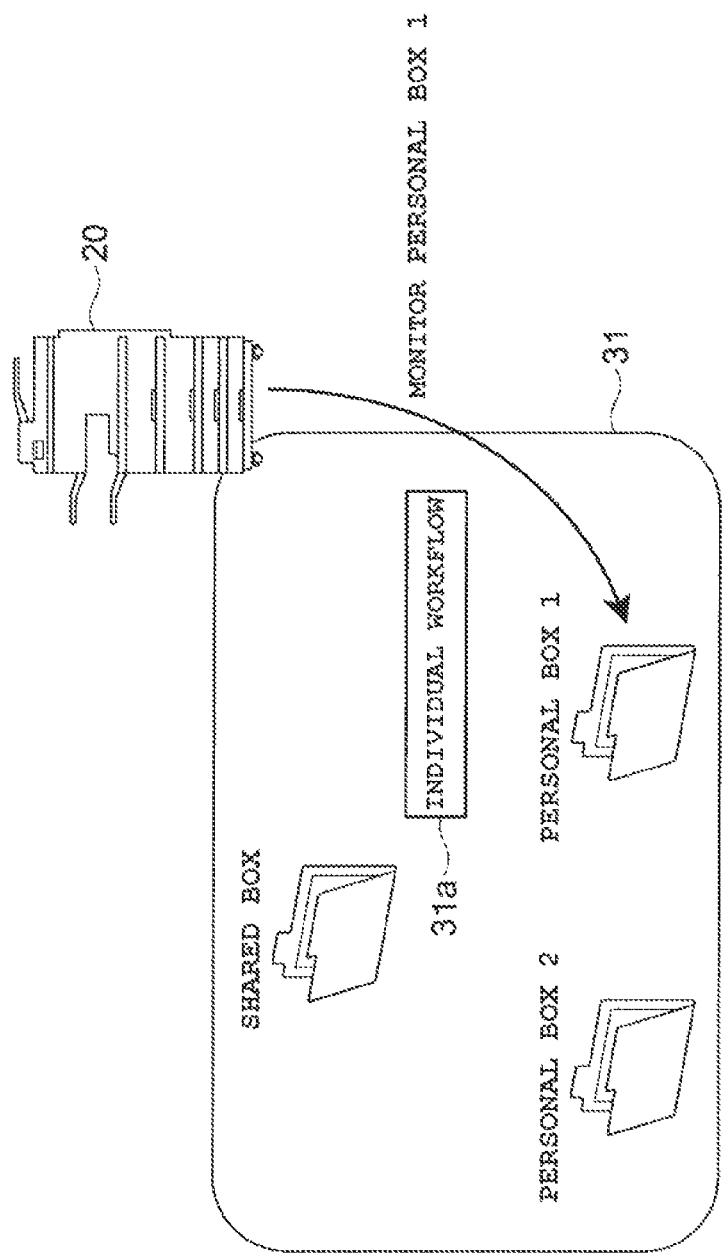
FIG. 9 illustrates a state after the individual workflow is registered in the image forming apparatus.

FIG. 9 illustrates the state after the individual workflow 31a is registered in the image forming apparatus 20.

As can be seen from FIG. 9, in order to detect the occurrence of the event of "a document is placed in the personal box 1" defined in the individual workflow 31a, the event detection unit 21a in the image forming apparatus 20 starts monitoring the personal box 1 within the storage unit 31.

Next, an example in which, by causing the above-mentioned shared workflow 17a and individual workflow 31a to collaborate with each other, a series of processing operations required by the user is performed on a document file will be described.

Figure 10:
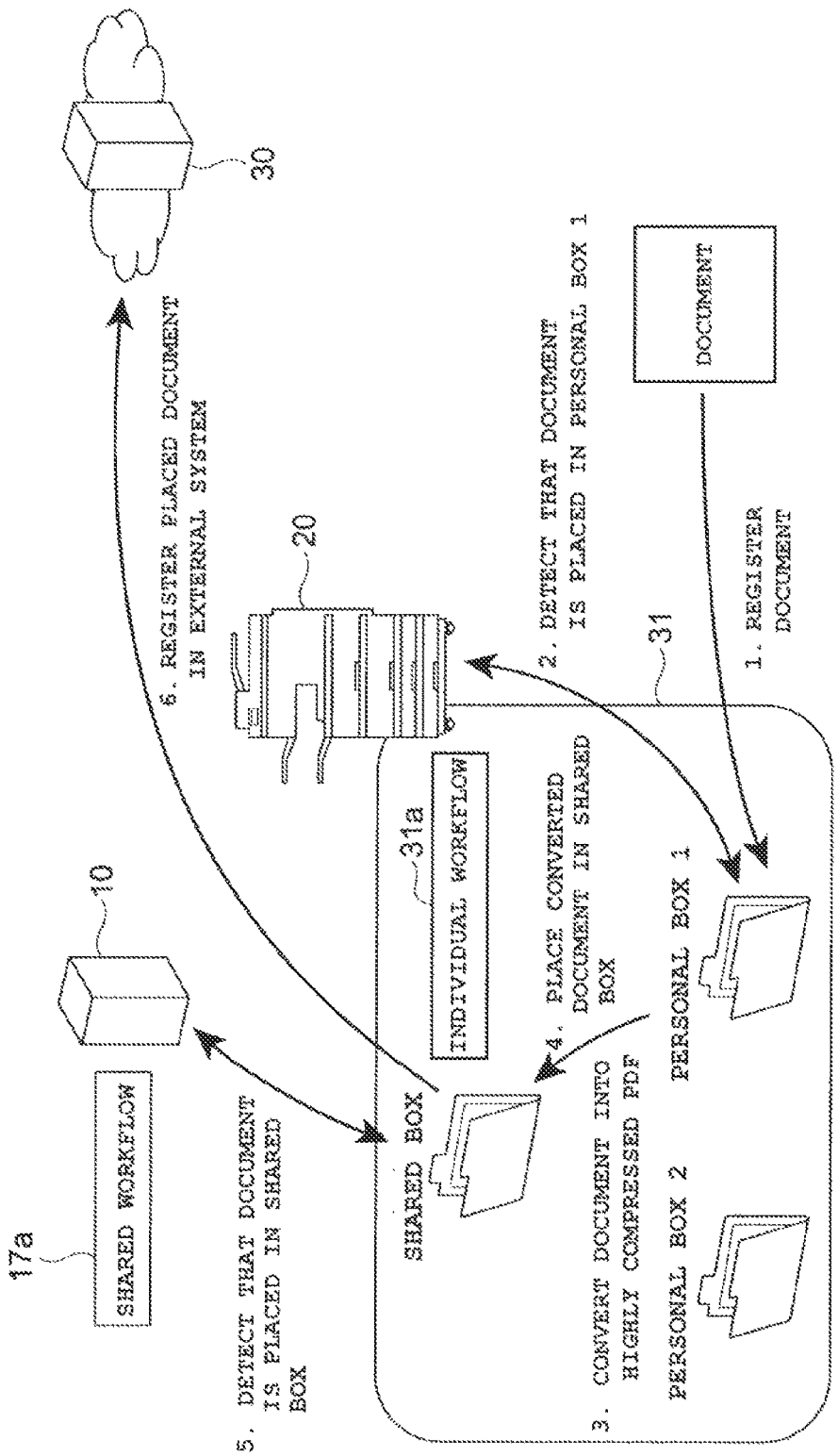
FIG. 10 illustrates an example in which, by causing the shared workflow and the individual workflow to cooperate with each other, a series of processing operations required by a user is performed on a document file.

FIG. 10 illustrates an example in which, by causing the shared workflow 17a and the individual workflow 31a to cooperate with each other, a series of processing operations required by the user is performed on a document file.

As the assumption of the cooperation of the workflows illustrated in FIG. 10, it is assumed that the shared workflow 17a and the individual workflow 31a are set in the workflow management server 10 and the image forming apparatus 20, respectively, and the shared box and the personal box 1 are individually monitored.

First, the general user registers a document in the personal box 1. Specifically, the document is placed in the personal box 1.

Next, the event detection unit 21a in the image forming apparatus 20 that has monitored the personal box 1 detects that the document is placed in the personal box 1.

The event that the document is placed in the personal box 1 occurs, thereby starting the individual workflow 31a. In addition, processing operation of "converting a document into a highly compressed PDF", which serves as the first task described in the individual workflow 31a, is performed by the workflow execution unit 21b. Furthermore, processing operation of "placing, in the shared box, the converted document", which serves as the second task described in the individual workflow 31a, is performed by the workflow execution unit 21b.

Based on the fact that the document is placed in the shared box, the workflow management server 10 that has monitored the shared box detects that the event of "a file is placed in the shared box" occurs. In addition, since the term, "document", here is one of the several types of file, the event is normally detected.

The event that the document is placed in the shared box occurs, thereby starting the shared workflow 17a. In addition, processing operation of "registering the placed file in the external system 30", which serves as the task described in the shared workflow 17a, is executed by the workflow management server 10.

As described above, the general user registers the individual workflow in which processing operations up to and including "placing the file in the shared box" are described, and only by placing the document in the personal box 1, the shared workflow 17a is executed in conjunction with the individual workflow 31a. Therefore, it is possible to cause processing operations up to and including the registering of the file in the external system 30 to be performed.

In addition, by defining processing operation for generating an event for causing a workflow required to be executed next to be executed, as a final task of an initially executed workflow, it is possible to cause any number of workflows to cooperate with or work with one another.

In a file processing system according to an embodiment, it is possible to combine a plurality of workflows and cause a series of processing operations to be performed. Therefore, it is only necessary for a user to define an individual portion out of a series of processing operations, except for a shared portion of processing. Since it is not necessary to define a large number of workflows in which some processing operations are different, it is possible to reduce the effort of defining workflows and improve efficiency in the file processing system according to an embodiment.

Since it is possible to divide and define a workflow, it is possible to finely set authority to execute and authority to register with respect to each workflow and it is possible to flexibly set authority relating to a workflow. It is possible to free a general user to define, for example, the processing of a file within the file processing system 1. In addition, in processing such as bringing a file to the external system 30 that relates to security, it is possible to allow only an administrator to define the content of processing.

The present technology is not limited to only the above-mentioned embodiments, and it should be understood that various modifications may be added thereto without departing from the scope of the present technology.

It should be understood that various changes and modifications to the embodiments described herein will be apparent to those skilled in the art. Such changes and modifications can be made without departing from the spirit and scope of the present subject matter and without diminishing its intended advantages. It is therefore intended that such changes and modifications be covered by the appended claims.

What is claimed is:

1. A file processing system comprising:
 a management server; and
 an electronic device connectable to the management server through a network, wherein
 the management server includes
 a first storage unit that stores therein a first workflow that is shared and used between users and defines first processing, which is executed with a first event as a trigger, for a compressed file, wherein the first workflow is set by an administrator having authority to manage the file processing system, and
 a first control unit that monitors, based on the first workflow, the first event and executes the defined first processing if the first event occurs, and
 the electronic device includes
 a second storage unit that stores therein a second workflow that defines, for each user, second processing, which is executed with a second event for each user different from the first event as a trigger and in which a final processing operation generates the first event, for an original file before being compressed, wherein the second workflow is set by a general user having authority as a user of the file processing system, and
 a second control unit that monitors, based on the second workflow, the second event and executes the second processing, which is defined by a user corresponding the second event, in a case where the second event occurs, wherein the second storage unit includes a shared box for the users and a plurality of personal boxes, the plurality of personal boxes corresponding to the users, respectively, the second control unit, based on the second workflow:
  detects an occurrence of the second event when the original file is placed in a personal box for a user; and
  when executing the second processing, which is defined by the user corresponding the second event, in response to the occurrence of the second event, converts the original file into the compressed file and places, as the final processing operation, the compressed file in the shared box, and the first control unit, based on the first workflow:
  while monitoring the shared box for the first event, detects an occurrence of the first event when the compressed file is placed in the shared box; and
  when executing the first processing in response to the occurrence of the first event, registers the compressed file, which is placed in the shared box, in an external system.

2. The file processing system according to claim 1, wherein:
  the first workflow defines a portion performed in common within processing used by the users; and
  the second workflow defines a portion individually performed by a user within processing used by the users.

3. A file processing method for a file processing system, the file processing method comprising:
  storing, in a first storage unit in a management server, a first workflow that is shared and used between users and defines first processing, which is executed with a first event as a trigger, for a compressed file, wherein the first workflow is set by an administrator having authority to manage the file processing system;
  monitoring, via a first control unit in the management server, the first event, based on the first workflow;
  executing, via the first control unit, the defined first processing in a case where the first event occurs;
  storing, in a second storage unit in an electronic device, a second workflow that defines, for each user, second processing, which is executed with a second event for each user different from the first event as a trigger and in which a final processing operation generates the first event, for an original file before being compressed, wherein the second workflow is set by a general user having authority as a user of the file processing system;
  monitoring, via a second control unit in the electronic device, the second event, based on the second workflow; and
  executing, via the second control unit, the second processing, which is defined by a user corresponding the second event, in a case where the second event occurs, wherein the second storage unit includes a shared box for the users and a plurality of personal boxes, the plurality of personal boxes corresponding to the users, respectively, the second control unit, based on the second workflow:
  detects an occurrence of the second event when the original file is placed in a personal box for a user; and
  when executing the second processing, which is defined by the user corresponding the second event, in response to the occurrence of the second event, converts the original file into the compressed file and places, as the final processing operation, the compressed file in the shared box, and the first control unit, based on the first workflow:
  while monitoring the shared box for the first event, detects an occurrence of the first event when the compressed file is placed in the shared box; and
  when executing the first processing in response to the occurrence of the first event, registers the compressed file, which is placed in the shared box, in an external system.

4. A non-transitory computer-readable recording medium storing therein a file processing program for a file processing system, the file processing program executable by a computer, the file processing program comprising:
  a first program code that causes a computer in a management server to store, in a first storage unit, a first workflow that is shared and used between users and defines first processing, which is executed with a first event as a trigger, for a compressed file, wherein the first workflow is set by an administrator having authority to manage the file processing system;
  a second program code that causes the computer in the management server to monitor the first event, based on the first workflow;
  a third program code that causes the computer in the management server to execute the defined first processing in a case where the first event occurs;
  a fourth program code that causes a computer in an electronic device to store, in a second storage unit, a second workflow that defines, for each user, second processing, which is executed with a second event for each user different from the first event as a trigger and in which a final processing operation generates the first event, for an original file before being compressed, wherein the second workflow is set by a general user having authority as a user of the file processing system;
  a fifth program code that causes the computer in the electronic device to monitor the second event, based on the second workflow; and
  a sixth program code that causes the computer in the electronic device to execute the second processing, which is defined by a user corresponding the second event, in a case where the second event occurs, wherein the second storage unit includes a shared box for the users and a plurality of personal boxes, the plurality of personal boxes corresponding to the users, respectively, based on the second workflow:
  the fifth program code further causes the computer in the electronic device to detect an occurrence of the second event when the original file is placed in a personal box for a user; and
  when executing the second processing, which is defined by the user corresponding the second event, in response to the occurrence of the second event, the sixth program code further causes the computer in the electronic device to convert the original file into the compressed file and place, as the final processing operation, the compressed file in the shared box;

based on the first workflow:
  while monitoring the shared box for the first event, the second program code further causes the computer in the management server to detect an occurrence of the first event when the compressed file is placed in the shared box; and
  when executing the first processing in response to the occurrence of the first event, the third program code further causes the computer in the management server to register the compressed file, which is placed in the shared box, in an external system.

* * * * *